United States Patent [19]

Hayward

[11] 4,012,939
[45] Mar. 22, 1977

[54] LOCATION DETECTING DEVICES AND METHODS

[75] Inventor: Alan Thomas Joseph Hayward, Glasgow, Scotland

[73] Assignee: The Secretary of State for Industry in Her Britannic Majesty's Government of the United Kingdom of Great Britain and Northern Ireland, London, England

[22] Filed: June 10, 1975

[21] Appl. No.: 585,520

[30] Foreign Application Priority Data

June 12, 1974 United Kingdom ............. 26171/74

[52] U.S. Cl. .................................. 73/3; 73/205 R; 116/124 R; 277/3

[51] Int. Cl.² ..................... G01F 25/00; G01L 9/12

[58] Field of Search ................ 73/3, 205 R, 432 R, 73/398 R, 253, 255; 15/104.06 B, 104.06 A; 137/268; 340/282, 243, 239 R; 277/3, 34.3; 116/124 R

[56] References Cited

UNITED STATES PATENTS

| | | | |
|---|---|---|---|
| 2,371,251 | 3/1945 | Mauldin | 15/104.06 B X |
| 2,570,951 | 10/1951 | Hugo et al. | 15/104.06 B X |
| 2,772,561 | 12/1956 | Plank et al. | 73/3 |
| 2,981,335 | 4/1961 | Bucy et al. | 15/104.06 A X |
| 3,046,788 | 7/1962 | Laimins | 73/398 AR |
| 3,130,586 | 4/1964 | Taylor et al. | 73/398 AR |
| 3,541,837 | 11/1970 | Davis et al. | 73/3 |
| 3,737,886 | 6/1973 | Dinges | 340/239 R |
| 3,773,338 | 11/1973 | Fidler et al. | 277/34.3 X |
| 3,861,196 | 1/1975 | Domenighetti | 277/34.3 X |

FOREIGN PATENTS OR APPLICATIONS 352,925   7/1931   United Kingdom .................. 73/255

Primary Examiner—Richard C. Queisser
Assistant Examiner—Daniel M. Yasich
Attorney, Agent, or Firm—Cameron, Kerkam, Sutton, Stowell & Stowell

[57] ABSTRACT

A detection device for sensing the passage of a discrete body through a closely fitting pipe comprises a constriction which, by interaction with the moving body, produces a change in a mensurable parameter in the region of the constriction, which change is sensed by a suitable detector.

The invention is particularly applicable to detection of displacement members transported by fluid flow through the pipelines of meter provers used to calibrate fluid flowmeters.

10 Claims, 3 Drawing Figures

LOCATION DETECTING DEVICES AND METHODS

This invention relates to a device for detecting the passage of a discrete body moving past a station in a pipe.

Spherical or spheroidal displacement members in particular, which are a close fit in the pipe, are used to separate two liquids being transmitted through a pipe, the displacement member being transmitted through the pipe with the liquid. In another application, a displacement member comprising a sphere or spheroid may be used in fluid flowmeter calibrating apparatus known as a meter prover. In this application the sphere or spheroid is an interference or close fit in a pipe and moves with the fluid flow so that by measuring the time for the sphere or spheroid to travel a measured length of the pipe the flow rate can be calculated.

In both of the applications mentioned above one way of detecting the displacement member passing a given station along the pipe has been by means of mechanical switches located in the pipe, which involve mechanically movable parts which are subject to problems such as wear, friction, and inertia effects, introducing inaccuracies and possible eventual breakage and failure.

The present invention provides a detection device for sensing the passage of a discrete body through a closely fitting pipe comprising constriction means for producing a change in a mensurable parameter in the region of the constriction by interaction between the moving body and the constriction, and detection means for sensing said change. In particular the device may be used for sensing the passage of a discrete body which is transported by fluid flow through the pipe.

The constriction means may be an integral protrusion on the inner surface of the pipe or may be formed by a suitable insertion member which may be either rigid or elastic. Where the constriction is rigid the body must be sufficiently elastic to deform as it passes the constriction, but this may not be essential where the constriction is itself sufficiently elastic to permit passage of the moving body.

An elastic constriction may be conveniently provided in a cylindrical pipe by an O-ring seal tightly located in an annular groove in the inner surface of the pipe.

With an elastic spherical or spheroidal displacement member movable with a fluid flow along a hollow cylindrical pipe the constriction may be a rigid protrusion, preferably annular, and need protrude only a small distance into the pipe and extend only a small distance along the length of the inside of the pipe sufficient only to cause the sphere or spheroid to distort slightly to reduce its cross sectional dimension and momentarily increase the radial pressure between the displacement member and the pipe, which increase in radial pressure produces a corresponding increase in the longitudunal friction force between the displacement member and the pipe, which in turn causes a momentary increase in the pressure of the fluid behind the displacement member.

The detection means of the present invention may comprise one or more convenient pressure measuring or indicating devices, such as pressure transducers, located adjacent to the constriction. Suitable pressure transducers may be set into the wall of the pipe to minimise the disturbance to the fluid flow; if two are used, one may be located either side of the constriction. Alternatively, a hollow O-ring may be used to provide the constriction in which case the pressure sensing means, for example a single pressure transducer, may be connected to the inside of the hollow O-ring.

Other parameters of the device which are affected by transit of the discrete body through the constriction may be used to provide alternative indication of that transit. An alternative detector means sensitive to stress in the pipe wall or in the constriction may comprise strain indicating devices attached to the appropriate surfaces.

A further alternative detection means sensitive to temperature changes at the surface of the constriction caused by transit of the discrete body may comprise temperature indicating devices located adjacent the surface of the constriction.

Yet another alternative means, sensitive to changes in the capacitance of a gap, provided in a suitable constriction, may be employed. Such constriction may consist of an incomplete O-ring set into an annular groove in the inner surface of the pipe, to the open ends of which O-ring are attached two electrodes, one on either side of the gap. A capacitance indicating device may be connected between the electrodes. Entry of the moving body into the ring would force the ends apart thereby changing the capacitance of the gap.

One example of the invention is illustrated in the accompanying drawings of which;

Figure 1:
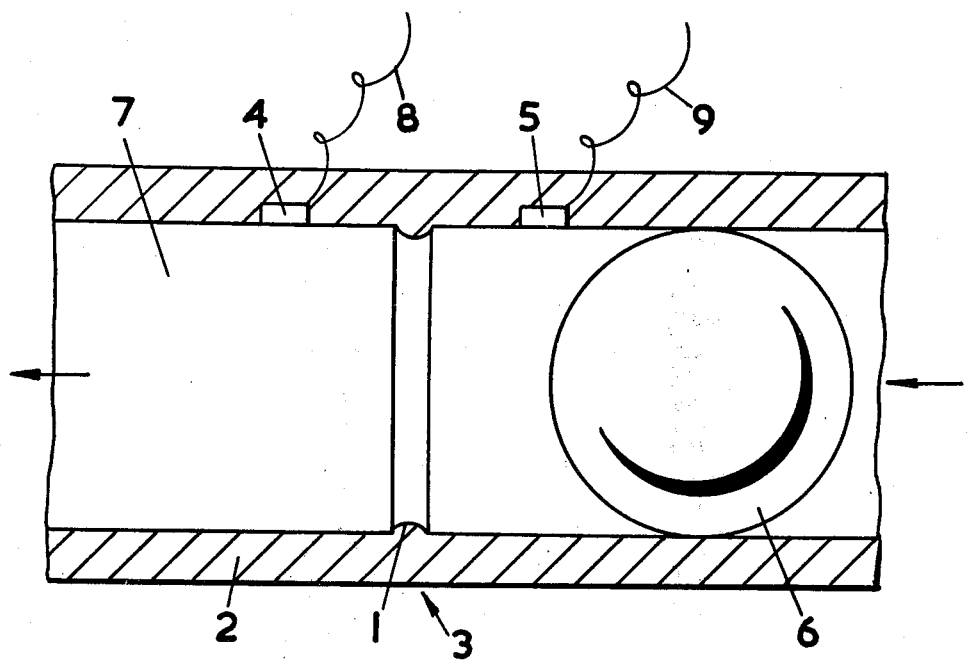
FIG. 1 is a schematic sectional view of a sphere detection device in the pipeline of a meter prover.

In FIG. 1, an annular protrusion 1 formed on the inside of a hollow cylindrical pipe 2, is located at a switching station 3 of the meter prover. Electrical pressure transducers 4 and 5 positioned on an imaginary line parallel to the axis of the pipe 2 and having respective connecting leads 8, 9 are located one either side downstream and upstream of the protrusion 1. An elastic spherical displacement member 6 is a tight fit within the pipe 2 and moves with the liquid 7 flowing in the pipe, and as it passes over the protrusion 1 the displacement member 6 distorts slightly and its radius is momentarily reduced. In consequence the pressure between the sphere 6 and the part of the pipe with which it makes contact is momentarily increased, producing a corresponding increase in the longitudinal friction force between the sphere and the part of the pipe with which it makes contact, which in turn causes a momentary increase in fluid pressure on the upstream side of the sphere 6 as it passes through the protrusion 1. The increased pressure will be sensed by the upstream pressure transducer 5, and may if desired be compared with the downstream pressure of the liquid in the pipe, sensed by the downstream transducer 4.

In this case, the output signals from the pressure transducers 4 and 5 can be fed to a computer circuit to produce a signal as the sphere passes the protrusion 1 at the station 3, which signal can be used to start or stop a timer used in connection with a meter prover. Alternatively the output from the upstream transducer alone may be used for this purpose. The meter prover may conveniently include a sphere detecting device located at each end of the pipe, both connected to the time so that the time for the sphere to travel with the liquid flow between the protrusions of respective stations at each end of the pipe can be determined. By having two pressure transducers positioned as shown the device may be made to operate with the sphere travelling in either direction.

The annular protrusion 1 may be produced on the inner surface of the pipe 2 by any convenient means. For example it may be made integral with the inner surface of the pipe as illustrated in the drawings or may be fabricated from metallic or non-metallic material and inserted into the pipe.

The magnitude of the pressure increase created when the sphere 6 passes the protrusion 1 of the station 3 will depend on the degree to which to which the protrusion extends into the pipe. With a very small protrusion the pressure rise may not be sufficient to give a clear signal, and with a very large protrusion the pressure rise might be so great as to damage the pipe, the displacement member or the flowmeter being proved. Between these two extremes, however, there will be a convenient size of protrusion which should give a pressure rise of a convenient magnitude to be readily detected and distinguished by the pressure transducers.

Figure 2:
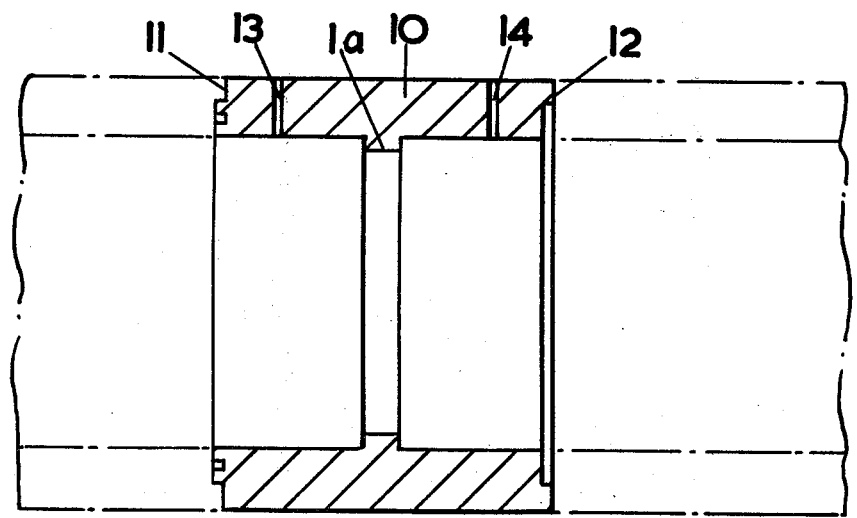
FIG. 2 is a sectional drawing of a preferred arrangement of the device.

A preferred arrangement is illustrated in FIG. 2 in which a tubular insertion 10 is provided, which unit may be conveniently positioned in a pipeline between two pipe flanges. The end face 11 of unit 10 is shaped to mate with a female pipe flange and the other end face 12 is shaped to mate with a male pipe flange. An annular protrusion is provided centrally within the unit and two pressure sensing channels 13 and 14 are provided radially through the cylindrical wall of the unit, each to communicate between the exterior and the interior of the unit, the channels being disposed in a common axial plane, one on each side of the annular protrusion 1a.

Although the invention in its particular application to bodies transported by fluid flow has been described thus far as a device for detecting the passage of a sphere at a station in a pipe, it can also be used for detecting the passage of other forms of moving bodies in pipes. For example, it can also be used to signal the passage of piston shaped meter prover displacement members and of "pigs" used for cleaning the inside of pipelines or for carrying instruments along pipelines. In these cases it will be necessary to shape the constriction or constrictions so that the displacement member or "pig" can ride over it, whilst ensuring sufficient increase in friction between the piston and inner surface of the pipe at the constriction as the leading seal on the piston between the piston and the inner surface of the pipe passes the constriction.

Further, the invention may be used in some of its particular forms to detect the passage of bodies moved through a pipe by means other than fluid flow, such as gravity or an initial impulsive force.

Figure 3:
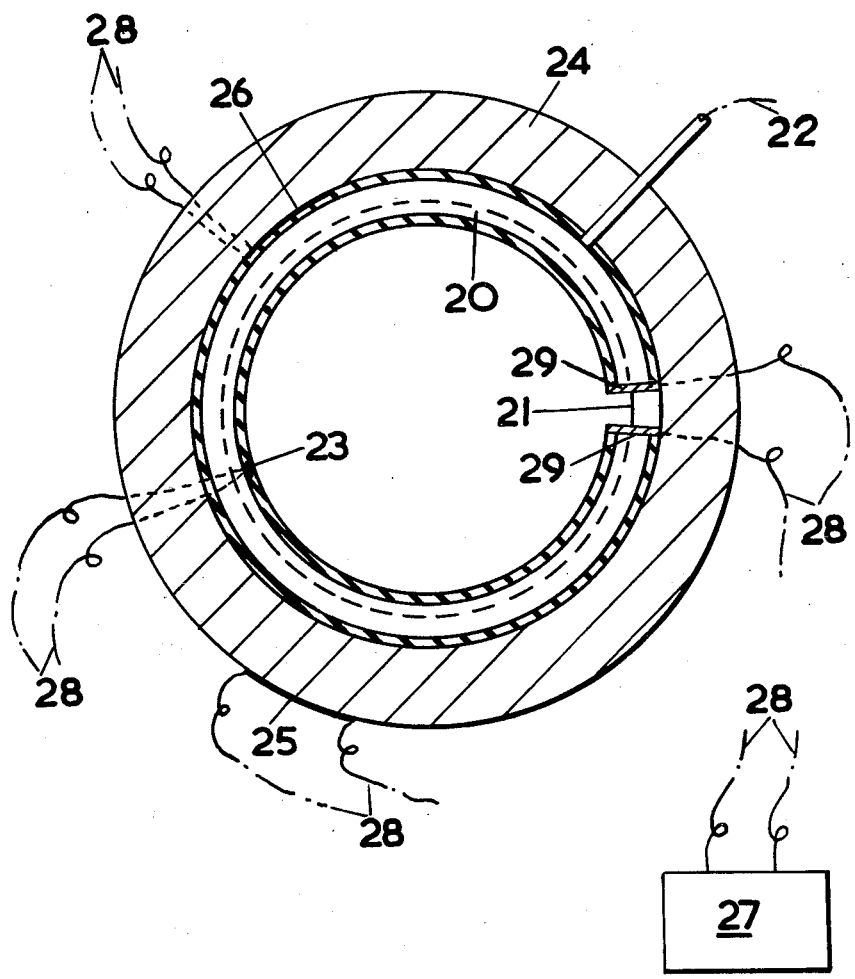
FIG. 3 is a diagrammatic section showing alternative arrangements.

FIG. 3 shows, diagrammatically, an arrangement using an O-ring 20 which may be solid or hollow or may be discontinuous leaving a gap 21 between its ends. If a hollow ring is used, detection can be obtained by measurement of pressure of a fluid within the ring by means 22 communicating therewith. Alternatively a temperature responsive device 23 may be mounted at the inner surface of the O-ring or strain measuring devices may be mounted on the O-ring or on the pipe 24, for example as shown at 26 and 25, respectively, or electrodes 29 mounted on the ring on either side of the gap may be used to measure capacitance across the gap. Signals from any of these measuring devices can be transmitted to an indicating device 27 through suitable connections 28.

I claim:

1. A detection device for sensing the presence of a passing discrete body transported longitudinally through a closely fitting pipeline by fluid flow, comprising an inwardly extending annular region of constricted cross-section formed within the pipeline, said region having an internal peripheral surface which is of smaller transverse cross-section than, and momentarily engageable with, an external peripheral surface of the passing discrete body, thereby to impede momentarily said fluid flow, and to cause a continuous build-up of upstream fluid pressure until said upstream fluid pressure is of sufficient magnitude to force said discrete body through said region, at least one of said two peripheral surfaces being resilient; and detection means in the internal surface of said pipeline and adjacent said region, adapted for detecting a momentary variation in a local, mensurable parameter, said momentary variation being consequent upon the momentary engagement between said two peripheral surfaces.

2. A detection device as claimed in claim 1 wherein both the pipeline and said peripheral surface of the discrete body are of substantially circular cross-section.

3. A detection device as claimed in Claim 1 which the mensurable parameter is strain and the detection means comprises at least one strain measuring device attached to an outer surface of the wall of the pipeline adjacent said region of constricted cross-section.

4. A detection device as claimed in claim 1 in which the mensurable parameter is temperature and the detection means comprises at least one temperature measuring device located adjacent said internal peripheral surface of said region of constricted cross-section.

5. A detection device for sensing the presence of a passing discrete body of circular maximum transverse cross-section transported longitudinally through a closely fitting pipeline of circular cross-section by fluid flow, comprising an inwardly extending annular region of constricted cross-section formed within the pipeline by an O-ring located within an annular groove in said inner wall of the pipeline and having an internal peripheral surface which is of smaller transverse cross-section than, and momentarily engageable with, an external peripheral surface of the passing discrete body, thereby to impede momentarily said fluid flow, and to cause a continuous build-up of upstream fluid pressure until said upstream fluid pressure is of sufficient magnitude to force said discrete body through said region; and detection means adjacent said O-ring adapted for detecting a momentary variation in a local, mensurable parameter, said momentary variation being consequent upon the momentary engagement between said two peripheral surfaces.

6. A detection device as claimed in claim 5 in which the mensurable parameter is strain and the detection means comprises at least one strain measuring device attached to the O-ring.

7. A detection device as claimed in claim 5 in which the mensurable parameter is capacitance, having an O-ring in which there is a small gap, and comprising a capacitance measuring device electrically connected between a pair of electrodes attached to the O-ring, one adjacent each bounding surface of said small gap to form a capacitor.

8. A detection device as claimed in claim 5 wherein the mensurable parameter is fluid pressure, having an O-ring which is of hollow section and fluid-filled; said detection means comprising a fluid pressure measuring device connected for measuring fluid pressure in the O-ring.

9. A detection device for sensing the presence of a passing discrete body transported longitudinally through a closely fitting pipeline by fluid flow, comprising an inwardly extending annular region of constricted cross-section formed within the pipeline, said region having an internal peripheral surface which is of smaller transverse cross-section than, and momentarily engageable with, an external peripheral surface of the passing discrete body, thereby to impede momentarily said fluid flow, and to cause a continuous build-up of upstream fluid pressure until said upstream fluid pressure is of sufficient magnitude to force said discrete body through said region, at least one of said two peripheral surfaces being resilient; and at least one fluid pressure measuring device connected for detecting a momentary variation in fluid pressure in the pipeline adjacent said region of constricted cross-section, said momentary variation being consequent upon the momentary engagement between said two peripheral surfaces.

10. A detection device as claimed in claim 9 in which two fluid pressure measuring devices are connected for measuring fluid pressure in the pipeline adjacent said region of constricted cross-section, one being upstream of said region and the other being downstream thereof, the output signals of the two measuring devices being arranged to indicate the pressure differential longitudinally across said region.

* * * * *